May 8, 1951     I. B. LASKOWITZ     2,552,008
JET-POWERED ROTOR SYSTEM FOR HELICOPTERS
Filed March 19, 1948     2 Sheets-Sheet 1
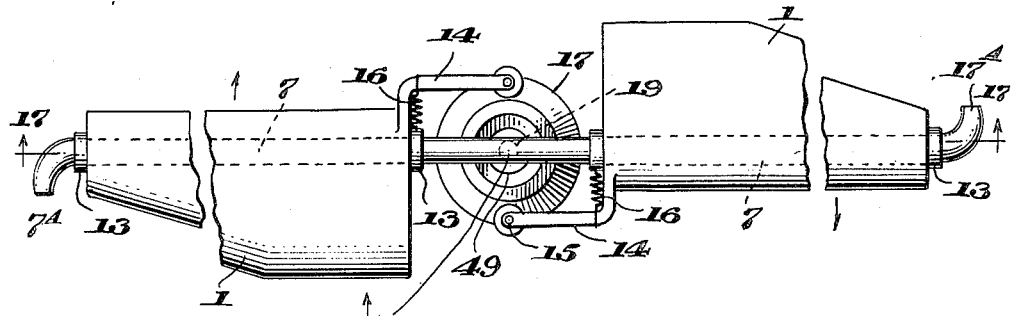
Fig. 1.
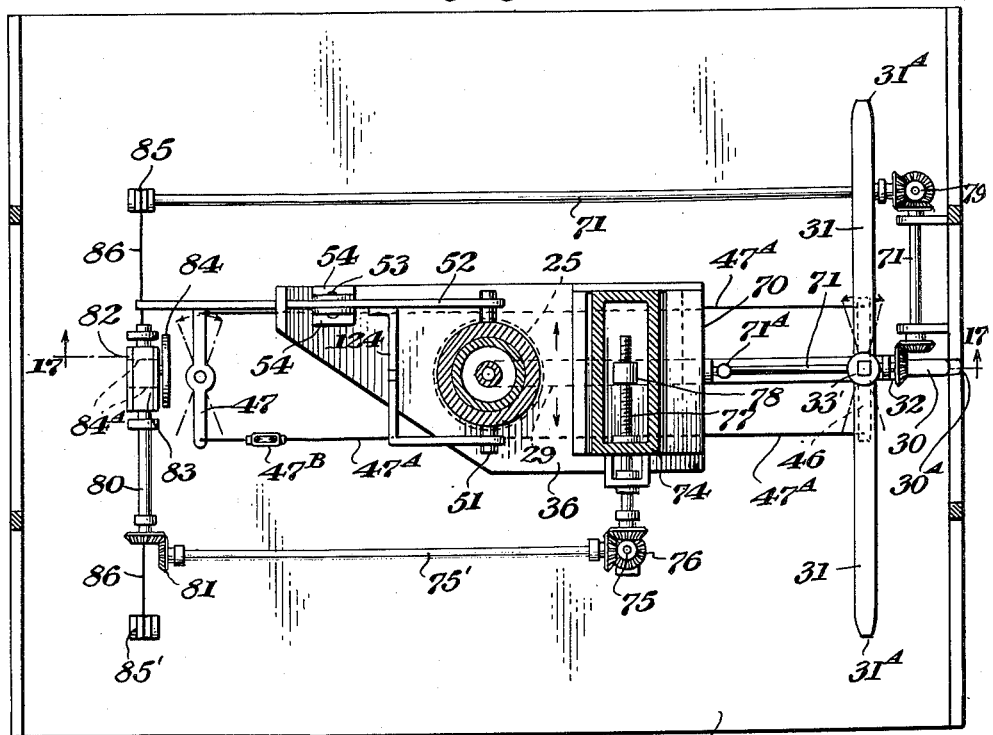
Fig. 2.
Fig. 6.
INVENTOR
I. B. Laskowitz,
BY Robert J. Dennison
ATTORNEY May 8, 1951     I. B. LASKOWITZ     2,552,008
JET-POWERED ROTOR SYSTEM FOR HELICOPTERS
Filed March 19, 1948     2 Sheets-Sheet 2
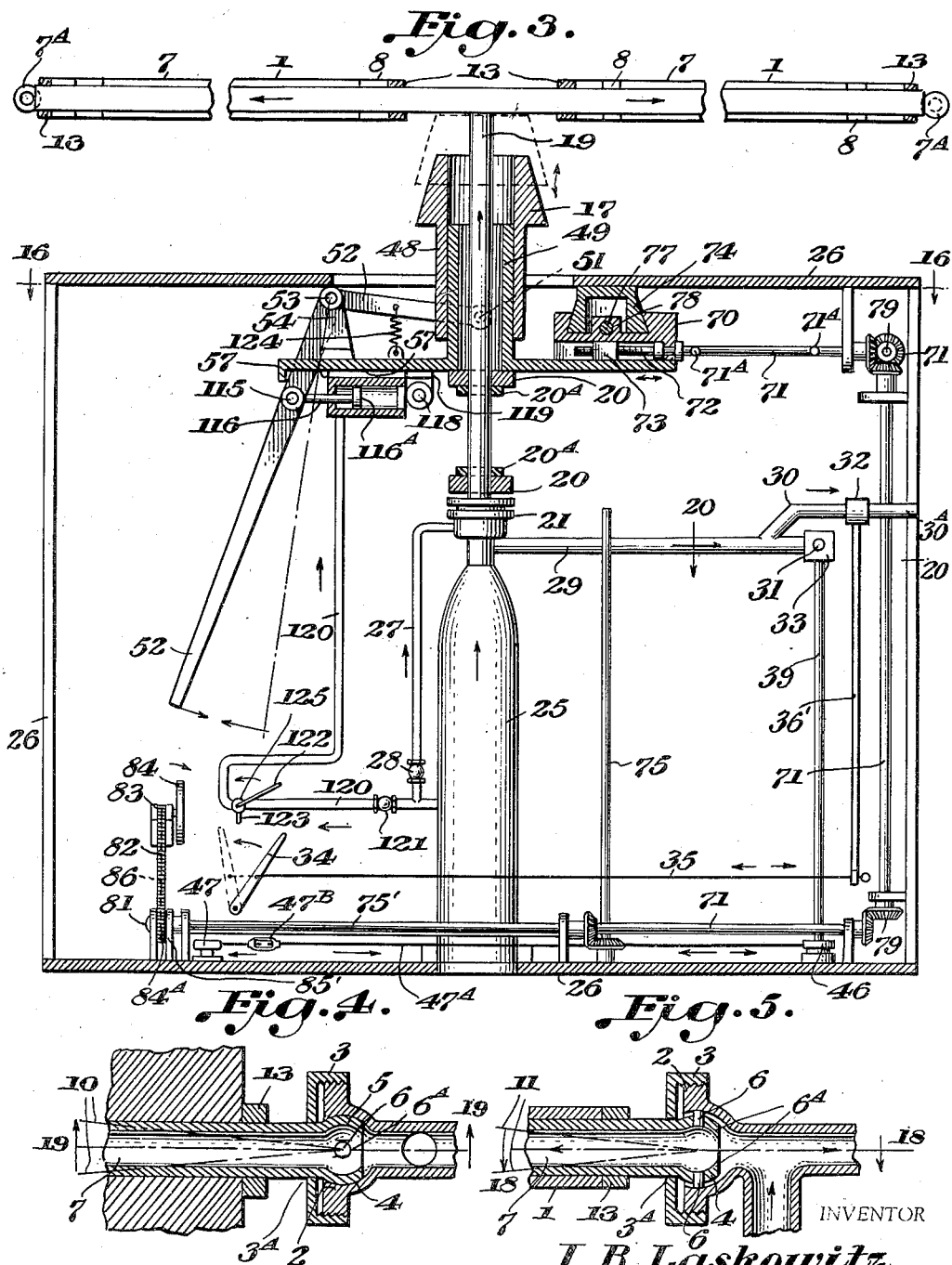
INVENTOR
I. B. Laskowitz,
BY Robert J. Dennison
ATTORNEY Patented May 8, 1951

2,552,008

UNITED STATES PATENT OFFICE 2,552,008

JET-POWERED ROTOR SYSTEM FOR HELICOPTERS

Isidor B. Laskowitz, Brooklyn, N. Y.

Application March 19, 1948, Serial No. 15,916

5 Claims. (Cl. 170—135.4)

This invention relates to jet-powered rotor system for helicopters and control means therefor.

It is a primary object of this invention utilizing jet power, to provide such mechanisms as will readily and easily provide for ascent, descent, movement to the right or left, forward or rearward of the aircraft; provide for hovering or suspension in the air without movement relative to the ground; provide controlling or adjusting mechanisms for maintaining lateral balance or stability and for maintaining longitudinal balance or stability; provide for steering or directional movement about the vertical axis of the aircraft; provide for autorotation of the lift mechanisms should the prime mover or motor fail, thus effecting descent safely without power in case such an emergency should arise.

Another object of the invention is to provide mechanisms and arrangements having all the qualifications above noted and yet be of such a compact nature as to occupy a small operating area horizontally eliminating all auxiliary propellers, rotors or other devices.

A further object of the invention resides in the provision of variable thrust mechanisms by means of which the direction of thrust may be varied to provide a vertical and horizontal component in any direction of the compass without rotation of the aircraft about its vertical axis.

Another object of the invention contemplates variable thrust mechanisms whereby direction and intensity of thrust may be varied to provide a vertical and horizontal component in any direction of the compass without inclining the axis of the rotor and concurrently effect control at will movement of the aircraft about its vertical axis for steering movement either clockwise or counterclockwise.

A further object of the invention is to provide a variable thrust mechanism embodying a jet-powered rotor whereby the pitch angles of the blades may be manually increased or decreased simultaneously to increase or decrease the lift or thrust of the rotor, and whereby the pitch angles of the blades of the rotor may be given a sinusoidal variation during each revolution to vary the thrust of the rotor in any direction of the compass and jet means arranged to balance any reaction torque created, and whereby the jet means may be varied so as to produce a resultant movement either clockwise or counterclockwise for control of the craft about the vertical axis.

Another important object of the invention is to provide a variable thrust mechanism whereby the pitch angles of the blades of the rotor may be optionally, automatically increased or decreased as the power output or speed of the engine or motor increases or decreases and so eliminate the need for manually reducing the pitch angles of the blades to that required for autorotation, with its corresponding loss of time, should the engine or motor fail and for otherwise varying the pitch angles of the blades for their most efficient operation.

Another object of the invention is to provide a variable thrust mechanism embodying a jet-powered rotor whereby the pitch angles of the blades of the rotor may be varied to vary the thrust of the rotor and jet means arranged for optionally producing additional forward thrust on the craft.

Another important object of the invention is to embody the features of variable thrust mechanisms having the qualities set out above which will be relatively simple in construction yet positive in action, strong and durable with parts arranged to facilitate ready and easy adjustments whenever necessary, thus assuring its practicability.

Other objects and advantages of the present invention will become apparent from the following detailed description of preferred embodiments of the invention illustrated in the accompanying drawings wherein like reference characters designate corresponding parts throughout the several views and wherein:

Figure 1 is a plan view of the rotor of the mechanism;

Figure 2 is a horizontal section taken substantially along the line 16—16 of Figure 3;

Figure 3 is a vertical section of the variable thrust mechanism embodying the invention taken substantially along lines 17—17 of Figures 1 and 2;

Figure 4 is a fragmentary horizontal section showing a hinged inner end blade arrangement taken along the line 18—18 of Figure 5;

Figure 5 is a fragmentary vertical section taken along the line 19—19 of Figure 4, and Figure 6 is an enlarged fragmentary horizontal section of the steering jet control valve taken substantially along the line 20—20 of Figure 3.

Referring now more particularly to the drawings, the preferred embodiments are illustrated as embodied in helicopters wherein airfoils, vanes or blades 1 constructed of any suitable or preferred materials constitutes the rotor. Each blade 1 is rotatably mounted for angular adjustment of the pitch on the tubes or hollow spars 7 by means of the ball or roller bearings 8. Collars 13 secured to tubes 7 prevent longitudinal movement of the blades 1 on the tubes 7. The outer ends of the tubes or spars 7 are bent to form exhaust nozzles 7A at right angles to the longitudinal axis of the tubes 7. In Figures 1 and 3 the inner ends of the tubes are shown rigidly constructed. In Figures 4 and 5, however, the inner ends of the tubes 7 and hence the blades 1, are pivotally mounted on the hollow spherical joint 2. The spherical joint 2 provides for small movement in a horizontal and vertical plane of the tubes 7 and consequently the blades 1. A threaded retaining nut 3 holds the spherical portion 4 of the tube 7 in its socket 5. The nut 3 also serves as a stuffing box gland to hold packing and prevent leakage of the spherical joint and may be spring loaded to give the desired degree of damping of the joint 2. Nut 3, after the desired adjustment is made, is locked to prevent working loss, because of vibration, by any of the standard methods. Pins 6 are secured to the spherical portion 4 of the tube 7 about its longitudinal axis and are slidably mounted in slots 6A cut in socket 5 of the joint 2. The purpose of the pins 6 and slots 6A are to prevent rotation of the tube 7 about its longitudinal axis, and hence maintain the position of the exhaust nozzles 7A in the horizontal plane of rotation of the rotor for proper direction of the reactive thrust at the nozzles 7A. The inner portion 3A of the retaining nut 3 limits the movement of the blades 1 in a horizontal and vertical plane.

The blades 1 are thus free to move in a horizontal plane to the extent shown by the lines 10 in Figure 4 and free to move in a vertical plane to the extent shown by the lines 11 in Figure 5.

Secured to the blades 1 at their inner ends are the arms 14 terminating with rollers 15 at its extremity. Rollers 15 through the action of the springs 16 on the arms 14 are kept in contact with the blade pitch angle changing cone 17. Thus, when rotating, the pitch angle or angles of incidence of the blades of the rotor depend on the position of the cone 17.

While two blades 1 are shown for the rotor, a greater or smaller number of blades may be employed without departing from the spirit of the invention. All parts fixedly secured together are preferably welded to each other although any other method of rigidly securing the members may be employed as desired.

The rotor is carried by a vertical tube 19 rotatably mounted in the bearings 20. Thrust collar 20A are mounted on tube 19 for carrying the load either upward or downward. Tube 19 extends into a stuffing box 21 formed at the exhaust end of a jet engine or turbine 25 mounted on the base of the supporting frame 26. The jet engine 25 may be of the turbo-jet type comprising a compressor, combustion chamber, turbine, accessories, etc. or any other suitable type, and may be mounted vertically as shown, or in any other suitable position. The stuffing box 21, is normally loosely packed and has a compressed air seal line 27, brought to it from the compressor of the engine 25. A standard control valve 28 regulates the pressure desired to the stuffing box 21.

The vertical tube 19 and the rotor mounted thereon, are free to rotate when the engine is not functioning. A standard brake mechanism of any suitable or preferred type (not shown) may be associated with the vertical tube 19, to prevent or retard its rotation when desired, or when the engine is not operating. When the engine is operating, compressed air will be transmitted to the stuffing box to help seal it, and the exhaust from the engine will be transmitted through the vertical tubing to the exhaust nozzles at the end of the tubes or spars of the blades of the rotor and produce a reactive thrust on the nozzles; thus causing the rotor to revolve at such speed as may be desired by the pilot by merely adjusting the throttle controlling the engine or setting the brake hereinbefore noted.

Upper bearing 20 also serves to give additional support to the eccentric bracket 36 hereinafter described. Below stuffing box 21, tube 29 is connected to the exhaust of the engine 25 and extends in a horizontal direction with a rear branch 30 and two side branches 31. Branch 30 terminates with nozzle 30A, and has a two-way control cock 32, installed therein. Branches 31 terminate with nozzles 31A and have a cylindrical control valve 33 installed at their junction as is more fully disclosed in Figure 6.

Control cock 32, which is normally closed, may be opened or closed by movement of the lever 34, which is connected by links 35 to rod 36', extending from the cock 32. Thus, if the pilot while in flight, or at any other time, desires additional forward thrust, he has but to shift lever 34 forward to open cock 32, to allow some of the exhaust to escape.

Control valve 33 has a port 37 in the rotatable portion 38 of the valve and may be operated by turning shaft 39. Port 37 of the valve 33, is normally adjusted so that when the engine 25 is operating enough exhaust is permitted to escape to either of the side branches 31 to balance what little reaction torque is created by the rotor due to friction or otherwise, thereby eliminating any tendency for the mechanism to rotate about its vertical axis.

On the other hand, with the rotor operating under motive power, if the port 37 of valve 33 is rotated in either direction to permit a larger volume of the exhaust from branch 29 to escape through either one or the other of the branches 31, it may be possible to set up a positive or negative moment which will cause the craft to rotate about its vertical axis in a clockwise or counterclockwise direction, depending on the directional rotation of shaft 39.

Shaft 39 has rotatably mounted at its lower end a lever 46 responding to movement of steering foot lever 47. Thus, shaft 39 and hence port 37 of valve 33 may be caused to move in one direction or the other, by shifting foot lever 47 in one direction or the other. Steering foot lever 47 is connected to lever 46 by means of wire rope 47A and turnbuckles 47B as in conventional aircraft. Instead of foot lever 47, standard foot pedals may be employed to give the same rotary movement to valve 33.

Blade pitch angle changing cone (frustum of) 17 is carried by cylindrical support 48 which is slidably mounted on the neck portion 49 of the eccentric bracket 36. Engaging the cone support 48 near the lower end at its pins 51, is the lever 52 pivotally mounted on the pin 53 between the brackets 54 secured to the eccentric bracket 36. High and low limit stops 57 are provided for limiting the high and low positions of the cone 17. In the arrangement described, it is possible with the rotor rotating to raise and lower the cone in any desired position by shifting lever 52 backward or forward.

The effect of raising the cone 17 is to simultaneously increase the pitch angles of the blades of the rotor and consequently to increase the lift or thrust of the rotor. Lowering the cone 17 has the reverse effect.

Referring to Figure 3, the lever 52 for changing the pitch angles of the blades engages the pivoted end 115 of the piston rod 116, secured to a piston 116A, which slides in the cylinder 117. Cylinder 117 is pivotally supported at one end by means of the pin 118 and the bracket 119, which is secured to the eccentric bracket 36. A spring 124 creates a pull on lever 52 tending to bring the lever 52 in its lowest position and consequently the smallest pitch angle setting for the blades 1. Pivoted end of the cylinder 117 is open to the atmosphere, the other end of the cylinder 117 is connected by means of the flexible pipe line 120 to the air compressor discharge of the engine 25 for actuating the piston 116A when desired. A standard control valve 121 regulates the pressure desired to the cylinder 117. A standard four-way cock 122 is inserted in the compressed air line 120 and may be operated by the hand lever 123 within easy reach of the pilot. The cock 122 is provided with an atmospheric outlet 125. The cock 122 may be so operated that the discharge from the air compressor is fed to the cylinder 117 or the discharge from the compressor is cut off and the pressure side of the cylinder 117 is also open to the atmosphere.

Since the air compressor is directly connected to the engine 25 the speed of the compressor and hence the air pressure supply to the cylinder 117 will vary with the speed of the engine.

With the cock 122 set to supply pressure to the cylinder 117, as the engine 25 rotates, the air compressor will also operate and create a pressure in the pipe 120, which pressure will actuate the piston 116A in the cylinder 117 and move the lever 52 which in turn will raise the cone support 48 to increase the pitch angles of the blades against the action of the spring 124. As the speed of the engine 25 is increased or decreased, the pressure created by the air compressor will also be increased or decreased and as a result lever 52 will be raised or lowered and automatically increase or decrease the pitch angles of the blades. Since the speed of the engine 25 is controlled by its throttle, the variation in the pitch angles of the blades will automatically vary with the setting of the throttle lever. And for any position of the throttle lever, should the engine fail, the lever 52 will be automatically lowered to decrease the pitch angles of the blades to that required for autorotation, without loss of time, for a safe descent of the craft.

With the cock 122 set so that the pressure side of the cylinder 117 is also opened to the atmosphere, the pitch angle of the blades may be varied by operating the lever 52 by hand. Thus, provision is made for changing simultaneously the pitch angles of the blades either automatically or manually, at the will of the operator. The lever 123 of the cock 122, is provided with a pointer to indicate the "automatic" and "manual" operating positions.

Neck portion 49 of eccentric bracket 36 is concentrically shown on the drawings with respect to the vertical tube 19 which carries the rotor. In this position, for any given setting of the cone 17 by the lever 52, the pitch angles of the blades of the rotor when rotating, will be same. However, if the neck portion 49 is moved in a horizontal plane off center the pitch angles of the blades of the rotor are varied from a maximum to a minimum in every complete revolution. This eccentricity produces a sinusoidal variation of the pitch angles of the blades of the rotor during each revolution and may be utilized to vary the lift or thrust of the rotor in any direction of the compass. The effect is the same as inclining the axis of the rotor.

For the purpose of moving the center F of the neck portion 49 of eccentric bracket 36 in a horizontal plane, I prefer to employ the wheel and rocking bridge control mechanism together with one of the eccentric brackets more fully and specifically described and claimed in United States Letters Patent No. 1,872,758, granted to me August 23, 1932, for Variable Thrust Mechanism.

Briefly, such mechanism may be applied in the present disclosure by carrying neck portion 49 on eccentric bracket 36. The latter is slidably carried on a slotted member 70 and may be moved from side to side as viewed in Figure 3, by rotating shafting or spindles 71 threaded at its end at 72 and extending through a threaded boss 73 carried by the eccentric bracket 36. Slotted member 70 is in turn slidably mounted on the frame member 74 secured to frame 26. This arrangement provides for the lateral movement at right angles to the direction of movement possible in Figure 3, as will be apparent from Figure 2, such movement being responsive to rotation of the shaft 75. Bevel gears 76 operatively connect shaft 75 with a threaded spindle 77 which is in turn associated with an internally threaded boss 78 provided in the slotted member 70.

Bevel gears 79 provide driving connections between the various sections of the shafting 71 for transmitting rotary motion from each section to the next. Near the ends of upper shaft section 71 there are provided universal joints 71A to allow for its inclination whenever the eccentric bracket 36 is moved from side to side. Shaft section 75' of the shaft 75 is adapted to extend along the bottom of the frame 26 and is driven by the hollow shaft 80 by means of bevel gears 81. Attached to the inner end of the shaft 80 is an inverted U-shaped rocking bridge 82. A suitable grooved flexible cable drum 83 is mounted at the top of the bridge 82 and is adapted to be turned by a hand control wheel 84. Adjacent to the bottom of the rocking bridge, there are provided a pair of pulleys or guide sheaves 84A. Shaft section 71 is adapted to extend along the bottom of frame 26 toward the rocking bridge and has a grooved drive pulley 85 secured thereto. A similar grooved pulley 85', but acting only as an idle pulley, is disposed in opposed relation to pulley 85. A flexible cable 86 of wire rope preferably, is wound around the drum 83, sheaves 84A, through hollow shaft 80 and around pulleys 85 and 85'. The ends of the cable are preferably secured by a turnbuckle for the purpose of adjustment when necessary.

As will be evident, the construction and arrangement is such that by turning control wheel 84 in one direction eccentric bracket 36 will move to one side or the other as indicated by arrows in Figure 3, depending upon the direction of rotation of the wheel. Also, by inclining the rocking bridge 82 or dipping it fore and aft, the eccentric bracket is moved in opposite directions at right angles to the previously described movement in the direction of the arrows illustrated in Figure 2. Thus, it is possible to vary the lift or resultant thrust of the mechanism in any direction, such as from the vertical position to any other inclined position, so as to cause forward translation of the craft, movement to the rear, movement sidewise to the lift, or sidewise to the right. By varying the thrust or lift from the vertical position to an inclined forward or rearward position, longitudinal stability or control may be had, while shift to an inclined sidewise to the left or right position, provides for lateral stability or control.

With rotation or steering of the craft about its vertical axis accomplished by means of rotating cylindrical control valve 33, stability and control of the craft about all three axes is obtained.

A valve control means (not shown) may be provided and located at the top portion of the engine 25 in the outlet thereof, whereby the supply of gas under pressure to the jet-powered blades may be regulated if found necessary. Control of the pressure from the engine outlet to the jet-powered blades is afforded by the throttle of the engine; namely, by adjusting the throttle of the engine the speed of the engine may be increased or decreased and the pressure supplied to the blades is correspondingly increased or decreased.

The wheel and rocking bridge control mechanism is so arranged that movement of the wheel 84 to the right would correspond to a movement of the craft to the right and a movement of the wheel to the left would correspond to a movement of the craft to the left. Also, that a forward inclination of the rocking bridge 82 would correspond with a forward movement of the craft and that a rearward inclination of the bridge would correspond to a rearward movement of the craft.

A variable thrust mechanism of the character described may be applied to land or water craft or to any other type of craft in which it may be useful. The compactness of the arrangements is such as to readily lend itself to use in a confined area both as to craft and the space which may be available for operation of the craft. It will be clear that all controls are approximately disposed and are of a positive acting nature so as to avoid any element of failure of operation and control.

Obviously, minor changes may be made in the preferred embodiments without departing from the essence of the invention or the scope of the appended claims. Thus, ball or roller bearings may be employed in place of the sleeve bearings disclosed. Other blades may be employed in place of the blades shown. It is contemplated that other equivalent mechanical, hydraulic or electrical control movements might be substituted for the one shown without essentially departing from the spirit of the invention.

Having fully disclosed my said invention, what I claim is:

1. In an aircraft, comprising a jet-propelled and jet guided helicopter, said helicopter having a frame constituting a housing, means in said housing to maintain a gas supply means under pressure, a plurality of blades articulately connected with a hollow shaft, said shaft being connected directly and rotatably to said gas supply means, each of said blades being swivelly mounted on a hollow spar terminating at its outer end in a substantially horizontally projecting jet nozzle, the inner ends of said spars being in communication with said hollow shaft, a tubular element being connected directly to said gas pressure supply means and projecting toward the rear of said helicopter, said element having hollow branches extending therefrom and terminating in jet nozzles, at least one of said nozzles extending through the rear wall of said housing to accelerate the forward speed of said helicopter, at least one jet nozzle extending through each side wall of said housing adjacent said rear wall to control the direction of travel of said helicopter, control means in each branch, vertically shiftable means surrounding said hollow shaft in spaced relation thereto for controlling the pitch angle of said blades, in combination with lever mechanism supported in said housing for elevating and lowering said vertically shiftable means, said mechanism being in direct valve controlled communication with said gas pressure supply means whereby said mechanism may be operated, either manually or automatically.

2. The construction set forth in claim 1, in which a supported means telescopically engages said vertically shiftable means, said supported means being provided with laterally shiftable means to produce a sinusoidal effect on said rotating blades to vary the direction of thrust of the rotor, said supported means being provided with mechanical control means supported in said housing and operatively connected thereto.

3. An aircraft construction, comprising a jet-propelled helicopter, said helicopter comprising a frame constituting a housing having a gas supply means, in combination with means to maintain said gas under pressure, in further combination with a rotor having a plurality of blades, said rotor being connected by a hollow upright shaft directly to said gas supply means, said blades having therein tubular means connected articulately directly to said hollow shaft and terminating in a jet nozzle at the outer ends of said blades, said blades being swivelly mounted on said tubular means to provide for pitch adjustment of said blades, said pitch adjusting means surrounding said hollow shaft and being provided with means connected thereto to control adjustment of said pitch adjusting means, in still further combination with additional tubular jet nozzles connected directly by valve controlled tubular means to said gas supply means, one of said additional jet nozzles terminating to the rear of said housing to accelerate the forward speed of said helicopter, said other additional jet nozzles terminating adjacent the rear of the housing on the opposite sides of the housing to provide for directional control of the helicopter, said pitch control means being provided with means whereby it may be converted from pneumatic control to purely mechanical control.

4. In an aircraft, comprising a jet-propelled and jet guided helicopter, said helicopter having a frame constituting a housing, means in said housing to maintain a gas supply means under pressure, a plurality of blades articulately connected with a hollow shaft, said shaft being connected directly and rotatably to said gas supply means, each of said blades being swivelly mounted on a hollow spar terminating at its outer end in a substantially horizontally projecting jet nozzle, the inner ends of said spar being in communication with said hollow shaft, a tubular element being connected directly to said gas pressure supply means and projecting toward the rear of said helicopter, said element having hollow branches extending therefrom and terminating in jet nozzles, at least, one of said nozzles extending through the rear wall of said housing to accelerate the forward speed of said helicopter, at least, one jet nozzle extending through each side wall of said housing adjacent said rear wall to control the direction of said helicopter, control means in each branch, vertically shiftable means surrounding said hollow shaft in spaced relation thereto for controlling the pitch angle of said blades, in combination with lever mechanism supported in said housing for elevating and lowering said vertically shiftable means, said mechanism being in direct valved controlled communication with said gas pressure supply means whereby said mechanism may be wholly operated pneumatically, said lever mechanism being provided with means therein whereby said mechanism may be converted from a pneumatically controlled means to a purely mechanically controlled means.

5. In a jet propelled helicopter and control means therefor, comprising a frame constituting a housing, a source of gas supply under pressure within said housing, in combination with jet propelled blades, said blades being connected to said gas supply by a rotatable hollow shaft, means in said housing to control the supply of gas to said blades and the jets thereof, in still further combination with the control means connected directly to and in communication with said gas supply, said control means comprisining a valve controlled jet means having at least, one jet directed to the rear of the housing and exposed externally thereof to accelerate the forward speed of the helicopter, a plurality of jet means extending laterally adjacent the rear of said housing and exposed externally at least, one jet means extending to the right and a like number of jet means extending to the left, whereby the direction of movement of the helicopter may be controlled, and means for varying the pitch angle of the blades either manually or automatically in which each blade has on its inner end an articulate connection with said hollow shaft to provide for limited pitch adjustments of each blade in still further combination with pitch control means for said blades, said last named means being in connection with and in communication with said gas supply, said last named connection having valve control means therein.

ISIDOR B. LASKOWITZ.

REFERENCES CITED

The following references are of record in the file of this patent:

UNITED STATES PATENTS

| Number | Name | Date |
| --- | --- | --- |
| 1,471,764 | Wheeler | Oct. 23, 1923 |
| 1,893,612 | Caldwell | Jan. 10, 1933 |
| 2,334,967 | Thomas et al. | Nov. 23, 1943 |
| 2,346,007 | Chillson | Apr. 4, 1944 |
| 2,371,687 | Gerhardt | Mar. 20, 1945 |
| 2,408,489 | Stalker | Oct. 1, 1946 |
| 2,429,646 | Pullin | Oct. 28, 1947 |
| 2,435,080 | Hoover | Jan. 27, 1948 |
| 2,438,151 | Davis | Mar. 23, 1948 |
| 2,474,685 | McCollum | June 28, 1949 |

FOREIGN PATENTS

| Number | Country | Date |
| --- | --- | --- |
| 705,003 | France | Mar. 2, 1931 |
| 795,517 | France | Jan. 8, 1936 |
| 883,462 | France | Mar. 22, 1943 |
| 370,832 | Germany | Mar. 8, 1923 |
| 162,999 | Great Britain | May 12, 1921 |
| 556,866 | Great Britain | Oct. 26, 1943 |

OTHER REFERENCES

Aero Digest (Magazine), April 1, 1945, p. 87.